April 21, 1931.  H. J. GRAHAM  1,802,110
ELECTRIC GENERATOR
Filed Oct. 25, 1927    4 Sheets-Sheet 1
FIG. I.
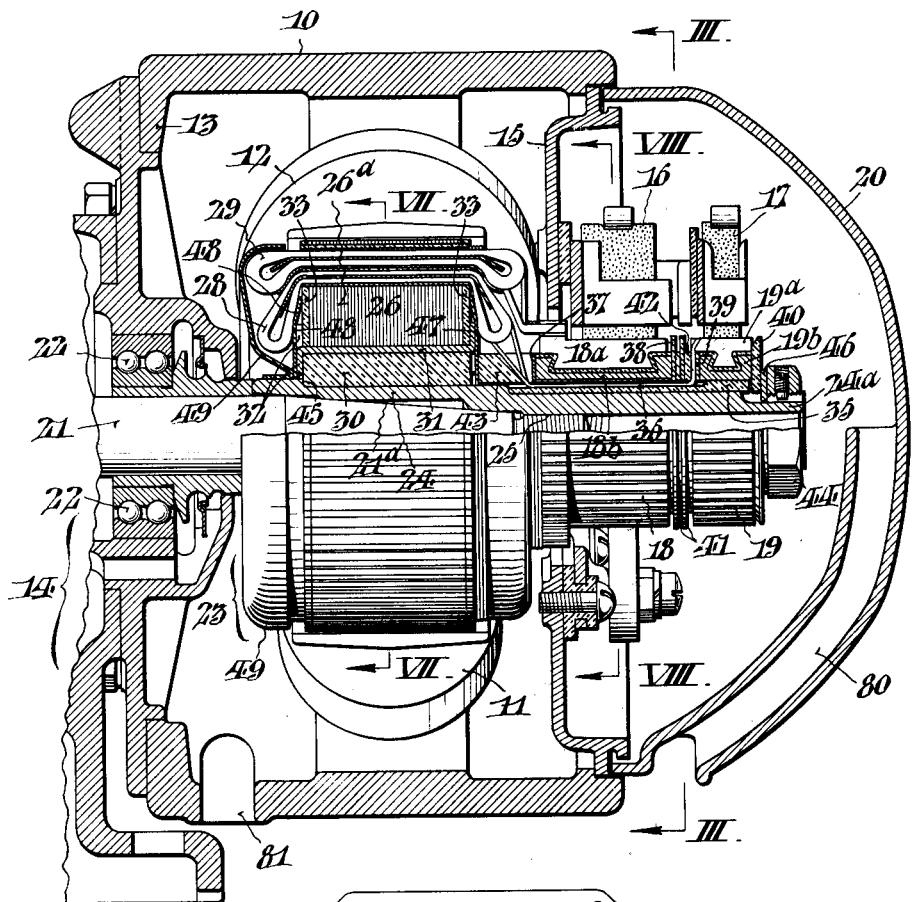
FIG. IX.
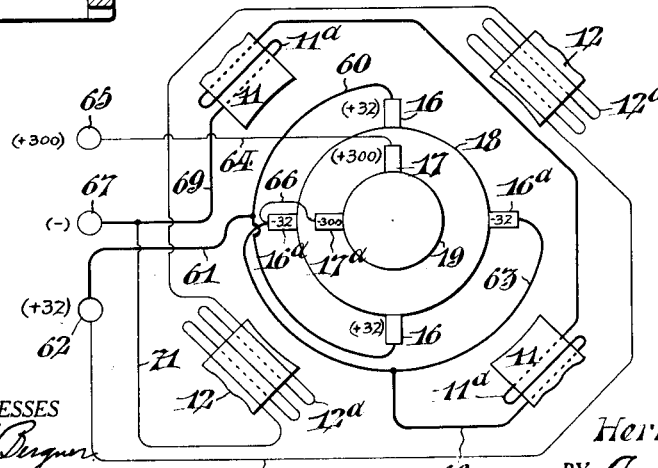
WITNESSES
INVENTOR:
Herbert J. Graham,
BY
ATTORNEYS.

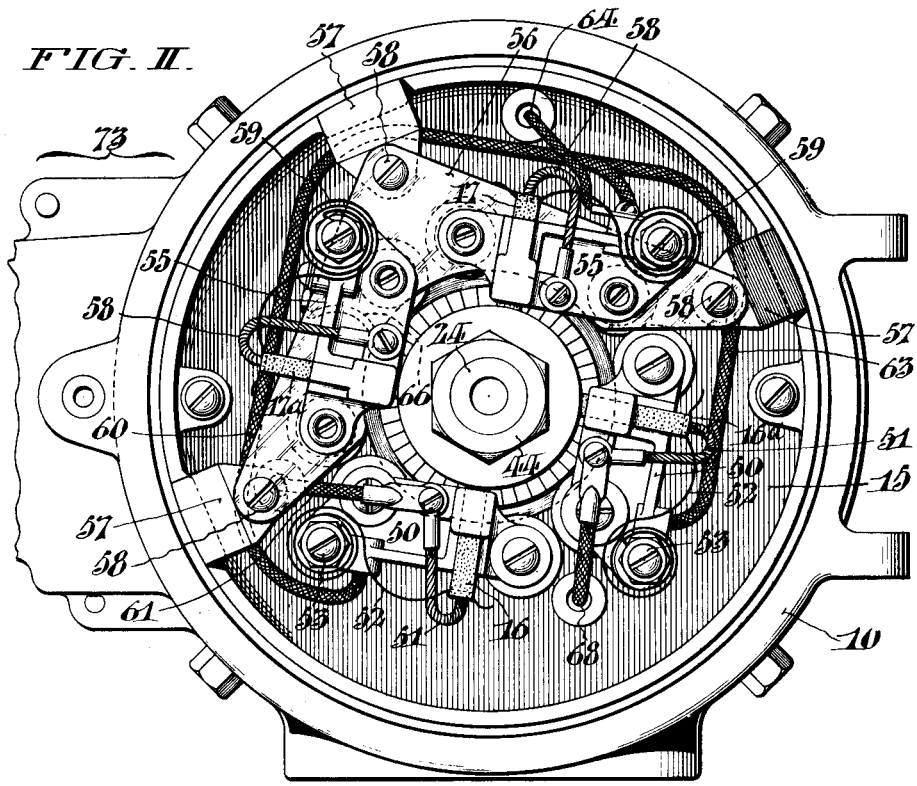
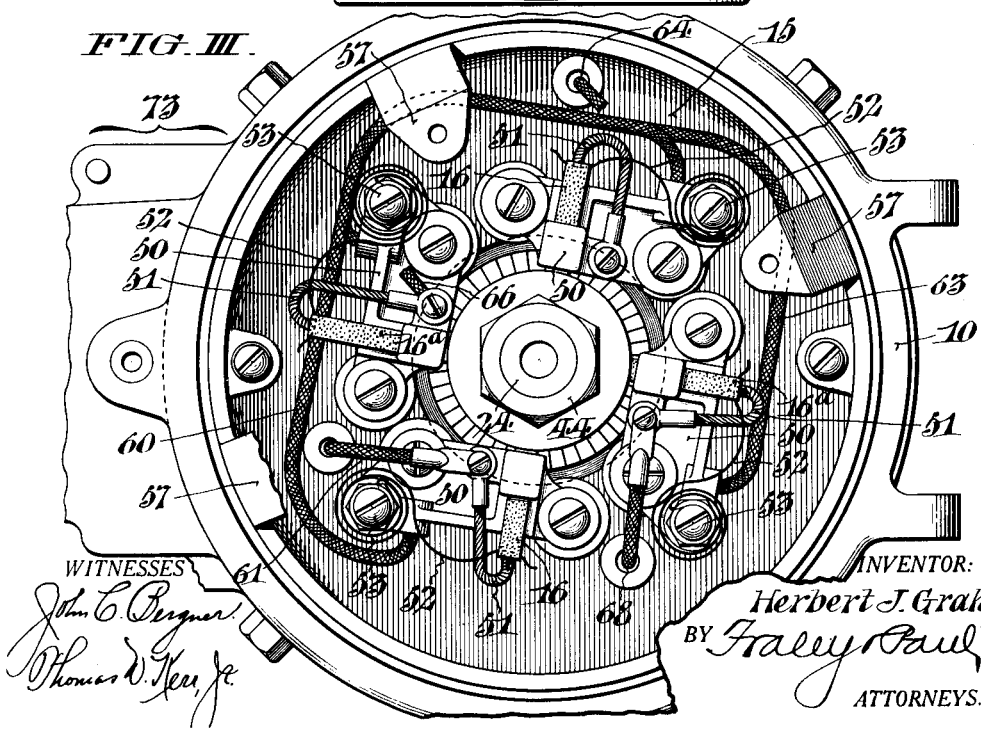

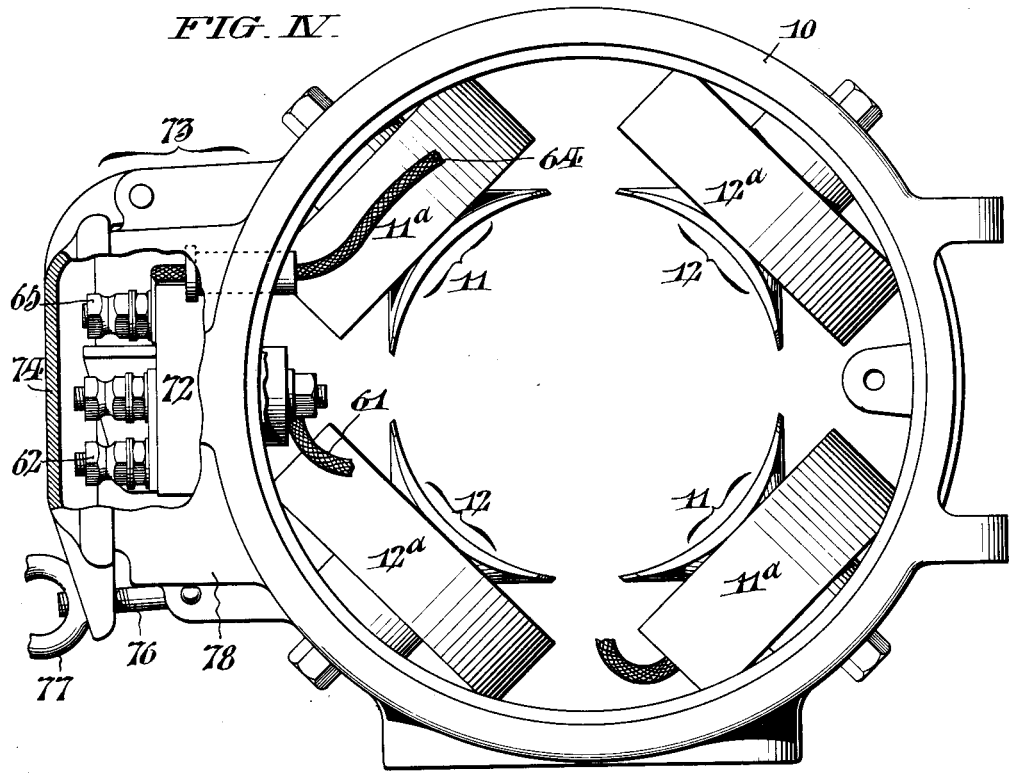
FIG. IV.
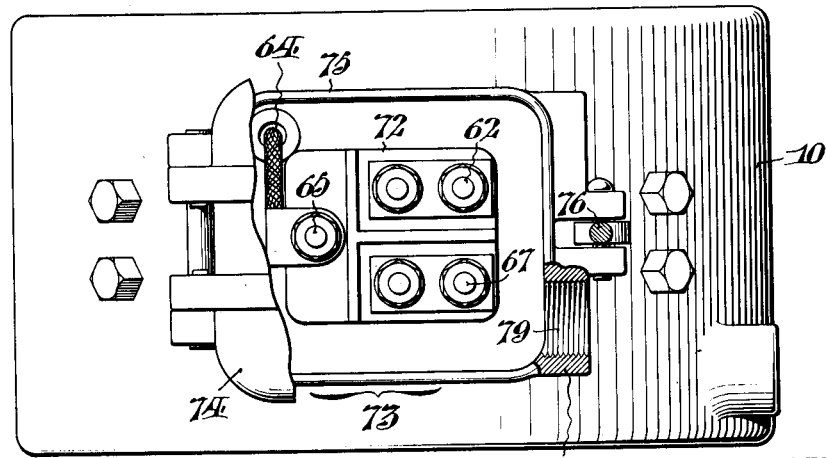
FIG. V.

April 21, 1931.  H. J. GRAHAM  1,802,110
ELECTRIC GENERATOR
Filed Oct. 25, 1927   4 Sheets-Sheet 4
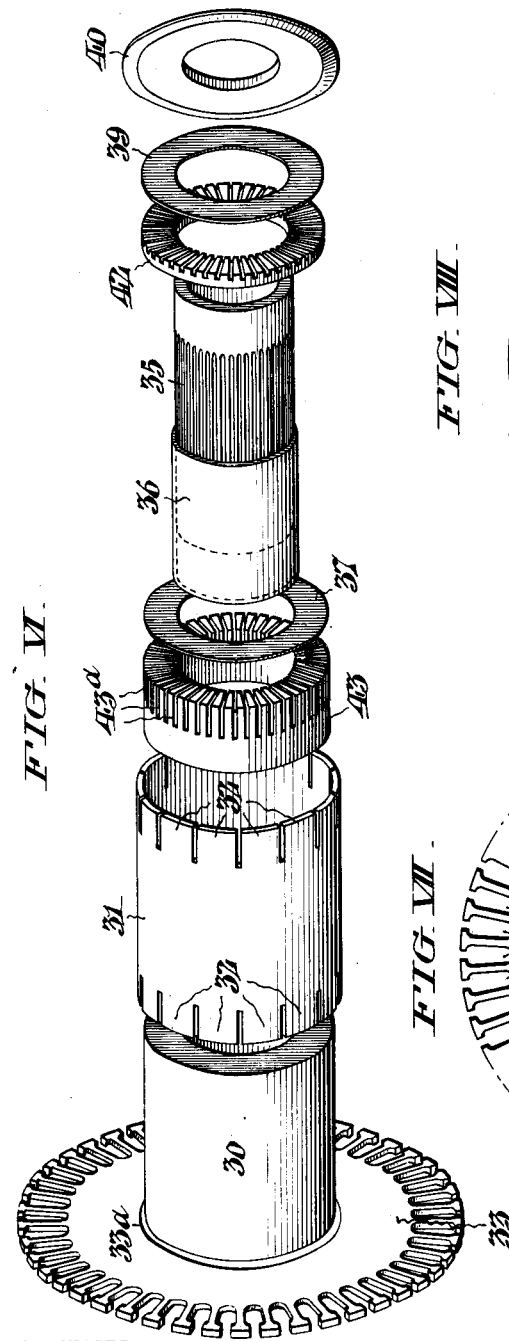
FIG. VI.
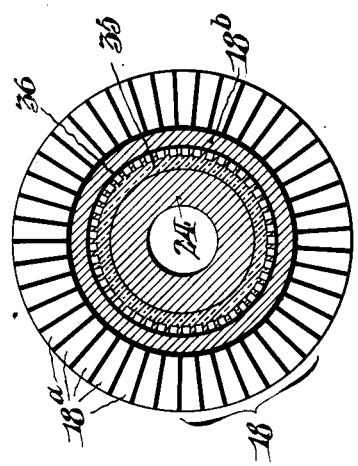
FIG. VIII.
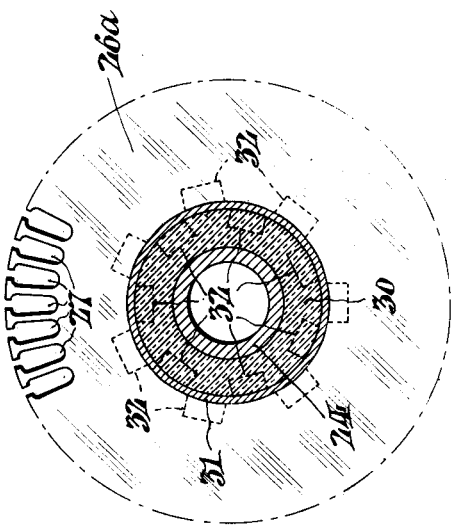
FIG. VII.
WITNESSES
INVENTOR:
Herbert J. Graham,
BY
ATTORNEYS.

Patented Apr. 21, 1931

1,802,110

UNITED STATES PATENT OFFICE

HERBERT J. GRAHAM, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA

ELECTRIC GENERATOR

Application filed October 25, 1927. Serial No. 228,534.

This invention relates to electric machines, and although concerned more particularly with generators, some of its novel features are employable to advantage with motors as well, so that the term generator as herein used in certain connections is to be regarded as comprehensive.

The main object of my invention is to enable simultaneous generation in a single unit, of several currents—either all direct, all alternating, or combinations of direct and alternating—of like or different voltages for as many individual power circuits without necessitating equalization or uniform distribution of loads as between the several circuits to insure balanced operation as required, for example, in the case of multi-phase alternating current generators. The generator of my invention is especially useful in connection with steam train operation where independent circuits are needed for the head lighting of locomotives, train control and signal systems, etc. For the purpose of exemplification, I have herein shown and described my invention as embodied in a form suitable to such use; but it is to be expressly understood that through changes in proportions and design—all within the scope of the appended claims—the generator may be otherwise adapted where currents of different characteristics are desired or required.

In connection with a generator of the type referred to, I further aim to provide for thorough insulation and protection of the generating coil leads to the commutators or current collecting rings respectively associated with them to the end of obviating the possibility of short circuiting between coils of the same or different groups.

Another object is to insure, in a generator having the foregoing attributes, against direct metallic contact between the armature core and its shaft mounting, and thereby to preclude current leaking or short circuiting through the generator housing.

My invention is further concerned with securing the above desiderata in a generator unit which is structurally simple, relatively inexpensive to build, sturdy, as well as highly efficient and reliable in operation.

Still further objects and attendant advantages will be manifest from the detailed description which follows when considered in connection with the drawings, whereof Fig. I is an axial sectional view of a generator conveniently embodying my invention.

Fig. II is an end elevation of the structure as viewed from the right hand of Fig. I, with its protective cover or door removed to expose parts at the interior.

Fig. III is a section taken as indicated by the arrows III—III in Fig. I.

Fig. IV is an end view of the field frame of the generator with parts broken away and in section to show important details to better advantage.

Fig. V is an elevation of the field frame as viewed from the left of Fig. IV, but turned horizontally.

Fig. VI is an exploded view in perspective of certain of the parts associated with the generator armature and the commutators showing these parts in the order in which they are assembled.

Figs. VII and VIII are detail sectional views taken respectively as indicated by the arrows VII—VII and VIII—VIII in Fig. I; and, Fig. IX is a wiring diagram of the generator.

As herein delineated, my improved generator embodies an annular housing frame 10 which supports within it a number of field magnets 11, 12 (in the present instance four) arranged in uniformly-spaced angular relation, see Fig. IV more particularly. One end of the annular field frame 10 is appropriately flanged circumferentially as at 13 for attachment to the casing of a turbine or other prime mover partly shown at 14. The opposite end of the field frame 10 is spanned by a plate or diaphragm 15 that serves as the main support for the mountings for the current collecting brushes 16, 16a, 17, 17a which co-operate with the two commutators 18, 19, the various appendages of said diaphragm being protected by a cover or door 20 hinged to said field frame. The shaft 21 of the generator is continuous with that of the prime mover 14, and is journaled in anti-friction ball bearings, whereof one is indicated at 22 in Fig. I. As shown, the commutators 18, 19 and the armature 23 are supported upon the free end of the generator shaft beyond the bearing 22.

In accordance with the present invention, the commuators 18, 19, and the armature 23 are constructed as separate assemblages and mounted on a common shaft member having the form of a sleeve 24 so that they can be removed from the shaft 21 intact for the purpose of inspection without necessity for individual dismantling. The sleeve 24 is conically bored for forced fitment over the tapered portion 21a of the shaft 21, and held in place through threaded engagement thereof with said shaft at 25. The armature 23 embodies a coil mounting or core 26 composed of a multiplicity of counterpart annular sheet iron laminations 26a which are arranged face to face after the manner commonly practiced in the art, the circumferential notches 27 (Figs. I and VII) of the stampings being however radially deeper than usual so as to define longitudinally-extending armature slots capable of accommodating two separate groups of current generating coils 28, 29 in superposed relation or one within the other as shown in Fig. I. It is, however, quite conceivable that the individual coils of the different groups could be placed in adjacent or neighboring armature slots if this should be found expedient or desirable without affecting the behavior of the generator as a whole. The laminated coil mounting or armature core 26 is supported on the sleeve 24 with interposition of an insulating bushing 30 which is surrounded by a tubular retainer 31 of metal. From Fig. VI it will be noted that the tubular retainer 31 has its opposite edges notched to provide a circumferential series of tongues 32 around each end. The ends of the coil mounting or core 26 are protected by stout insulating disks 33 having a configuration identical with that of the laminations 26a, and central openings 33a, to fit over the tubular retainer 31. As shown in Fig. I, the laminations 26a and the insulating disks 33 together aggregate the length of the bushing 30. Upon assembling of the parts 26a, 30, 31 and 33 the projecting end tongues 32 of the tubular retainer 31 are alternately bent in opposite directions so as to overlap the contiguous flush outer faces of the bushing 30 and the end insulating disks 33 as shown in Figs. I and VII. The several parts constituting the armature core are thus permanently bound together into a single structure capable of ready mounting on or removal from the sleeve 24. It will moreover be noted that the insulating support or spider formed by the parts 30, 33 serves as an effective barrier to prevent metallic contact with the coil mounting 26 at the ends, as well as between said mounting and the sleeve 24, thereby offsetting the possibility of grounding of the current generating coils 28, 29 through the shaft 21 and the field frame 10.

The commutators 18, 19 are made up as separate units with radially arranged segments 18a, 19a which are insulated from each other and from the spool-like core pieces 18b, 19b. As clearly shown in Fig. I, the commutators 18, 19 occupy the diametrically reduced end 24a of the sleeve 24, the latter being surrounded by a longitudinally fluted tube 35 (Fig. VI) of insulating material which is in turn surrounded, within the confines of the inner commutator 18, by a shorter plain tube 36 also of insulating material. The commutator 18 is protected at opposite ends by plain insulating disks 37, 38 which are apertured to fit over the fluted tube 35. The commutator 19 is likewise protected at opposite ends by plain insulating disks 39, 40; and between it and the commutator 18 are interposed additional insulating disks 41 as well as a collar marked 42, whereof one side has radial grooves which correspond in number and register with the flutings of the tube 35, see Fig. VI. It is to be particularly noted from Figs. I and VI that the radially-grooved face of the collar 42 abuts the disk 39. On the sleeve 24 between the armature core 26 and the inner commutator 18, I place a collar 43 (Fig. I) also of insulating material. This collar 43 has radial grooves 43a (Fig. VI) in that face which abuts the disk 37, the bottoms of the grooves 43a being inclined as clearly shown in Fig. I. A clamp nut 44 engaging the threaded end 24a of the sleeve 24 functions in opposition to a circumferential shoulder 45 of said sleeve to firmly secure the armature 23 and the commutators 18, 19 in place, while the insulating members 37, 43 determine their spacing on the aforesaid sleeve. By removing the nut 44 together with an associated facing washer 46, it will be seen that the commutators 18, 19 and armature 23 may be successively removed from the sleeve 24 if required.

Now it will be noted that the parts 35—43 together provide a series of interconnecting longitudinal and radial passages (Figs. I, VI and VIII) with formation of continuous ducts through and around the inner commutator 18 in the present instance for individual passage of the leads of the innermost group of generating coils 28 to the bars of the outer commutator 19. With this arangement the leads of the coils 28 are protected against the possibility of contact with one another and also against grounding through the shaft 21 and the field frame 10. As shown in Fig. I, the leads from the outermost group of current generating coils 29 of the armature 23 are directly connected to the respective bars 18a of the commutator 18. As a further precaution against short circuiting of the coil leads I make use of insulating disks 47, 48 (Fig. I) to cover the knocked over tongues 32 of the tubular retainer 31, as well as an insulating guard 49 to cover the coils 28, 29 at the inner or left hand end of the armature 23.

When the generator is to be used for generation of different currents at the same voltage, the armature coils 28, 29 are made identical as regards the number of wire turns in them. On the other hand, if different voltages are desired, one group of the armature coils is made with a greater number of turns than the other in the required ratios. In the present instance, I have shown the coils for the highest voltage (the coils 28) as lying innermost in the armature slots 27, and those for the lower voltage (the coils 29) outermost but this arrangement may obviously be reversed if expediency should so dictate. For train work such as hereinbefore mentioned, it is customary to employ currents differing considerably in voltage, the armature coils 28, 29 being designed accordingly with use of wire of different gages as exemplified in the drawings.

From Fig. III, it will be noted there are in the present instance four brushes 16, 16 and 16a, 16a to co-operate with the inner commutator 18, these being radially guided in suitable holders 50 carried, with interposition of suitable insulation, by the diaphragm 15. Each brush 16, 16a is electrically connected to its holder 50 by a flexible conductor 51, and urged inward toward the commutator 18 under the influence of a spring 52 which is coiled about a screw stud 53. With the outer commutator 19 I associate but two brushes 17, 17a which are guided in holders 55 carried by an auxiliary support 56. This support 56 is in the form of an angularly configured element fashioned from stout insulating material, and is secured to inwardly projecting lugs 57 of the diaphragm 15 by means of screws 58. The brushes 17, 17a are electrically connected to their holders 55 by flexible conductors 58 and urged inward by coiled springs 59 in the same manner as described in connection with the brushes 16, 16a.

With reference now to the wiring diagram of the generator shown in Fig. IX, it will be observed that the plus brushes 16 (32 volt) of the commutator 18 are connected together by a conductor 60 and the latter in turn connected by a lead 61 to a terminal 62. The brushes 16a (minus 32 volt) are in a like manner connected together by a conductor 63. The brush 17 (plus 300 volt) associated with the commutator 19 is directly connected by a conductor 64 with a terminal 65; while the brush 17a (minus 300 volt) is connected to the minus brush 16a of the commutator 18 by a flexible conductor 66, see Figs. II and III also. Referring again to Fig. IX, it will also be observed that the field windings 11a of the alternate poles 11 are connected in series between the conductor 63 and the common minus terminal of the generator indicated at 67 through leads 68, 69, and that the coils 12a of the alternate field poles 12 are connected in parallel across the 32 volt terminal 62 and the common minus terminal 67 through the conductors shown at 70, 71. In practice, the field coils 11, 11a and 12, 12a are so wound as to determine opposite polarities for alternate poles 11, 12 and with the illustrated arrangement are energized from the circuit of lowest voltage. However, the connections may obviously be changed readily so that field excitation is secured from the higher voltage circuit if this should be desirable.

Referring to Figs. IV and V, the terminals 62, 65, 67 are mounted in an insulating block 72 which is protected within an integral box-like offset 73 of the field frame 10. As illustrated, the terminals are accessible for the purpose of making exterior circuit connections, by way of an upwardly-swingable door 74 adapted to overlap the rounded edge lip 75 of the offset 73. Any suitable means such as a swing bolt 76 with a ring nut 77 may be employed to hold the door 74 tightly closed against the lip 75. At the bottom (Fig. V), the offset 73 has an embossment 78 with openings 79 for passage of external circuit leaders en route to the terminals 62, 65, 67.

The generator is cooled through circulation of air set up incidental to the rotation of the armature 23, the air entering through a channel 80 formed in the cover 20, and leaving through an opening 81 in the lower part of the field frame 10 at the opposite side of the armature 23. The channel 80, it will be noted, terminates near the end of shaft 24 so that the air is obliged to distribute itself all around the commutators 19, 18 and the armature 23 before escaping through the opening 81, thereby effectively cooling these parts as required for efficient operation of the generator.

From the foregoing it is apparent that I have provided a compact and sturdy generating unit capable of delivering separate currents at the same or different voltages without necessitating distribution of the loads in the different individual circuits served, since the current generating coil groups are entirely independent and uniformly allocated about the armature 23. The generator will therefore run in perfect balance under all conditions of operation.

Aside from the dual current generating coil arrangement 28, 29, the construction of the armature 23 is unique in that the leads to the outer commutator 19 are protected in completely closed individual ducts insuring thorough insulation to safeguard against leakage troubles likely to adversely affect the different output circuits. The same is true regarding the mounting of the two sets of current collecting brushes 16, 16a and 17, 17a.

Obviously the multi-current generator of my invention is subject to considerable diversification as regards the number of the different generating coil groups, commutators, or current collecting rings, etc. In view of the many variations possible in designing of generators embodying the principles of my invention, I do not in any way wish to be limited to the specific disclosure herein made nor to the specific uses mentioned.

Having thus described my invention, I claim:

1. In an electric generator, an armature, a rotative shaft therefor, an insulating bushing interposed between the shaft and the armature core, and a tubular metallic retainer surrounding the bushing, said tubular retainer having tongues at opposite ends adapted to be knocked over in opposite directions to lap the contiguous end faces of the armature core and the bushing.

2. In an electric generator, an armature with a core made up of laminations, a rotative shaft for the armature, insulating disks corresponding in configuration to the laminations aforesaid and protecting the ends of the armature core, an insulating bushing interposed between the axis and the armature core, and a tubular metallic retainer surrounding the insulating bushing, said tubular retainer having tongues at opposite ends adapted to be alternately knocked over in opposite directions to lap the contiguous end faces of the insulating disks and the bushing.

3. In an electric generator, an armature with separate groups of coils to generate currents for as many independent power circuits, a surrounding field frame, current conducting means individually associated with the generating coil groups and arranged side by side at one end of the armature core, a diaphragm spanning the field frame and having a central opening permitting protrusion of the current conducting means, said diaphragm constituting the main brush holder support and carrying the brushes for the innermost current conducting means, and auxiliary brush holder supports separable from the diaphragm to carry the brushes for the other current conducting means.

4. In an electric generator, an armature with separate groups of coils to generate currents for as many independent power circuits, current conducting means individually associated with the generating coil groups and arranged side by side on the armature shaft, brush sets to cooperate with the several current conducting means, means to directly support one set of the brushes with provisions for insulation therefrom as well as one from another, and insulating elements attached to said support and serving to sustain the other brush sets.

5. In an electric generator, an armature, a rotative shaft therefor, an insulating bushing interposed between the shaft and the armature core, and a tubular metallic retainer surrounding the bushing and having portions at opposite ends adapted to be lapped over the contiguous end faces of the armature core and the bushing.

6. In an electric generator, an armature, a rotative shaft therefor, insulation interposed between the shaft and the armature core, and a metallic retainer surrounding the insulation, said retainer having tongues at opposite ends adapted to be knocked over in reverse directions to lap the contiguous end faces of the armature core and the insulation.

7. In an electric generator, an armature with separate groups of coils to generate currents for as many independent power circuits, a surrounding field frame, current conducting means individually associated with the generating coil groups, means constituting the main brush holder support and carrying the brushes for one of the current conducting means, and an auxiliary brush holder support separate from said means to carry the brushes for the other current conducting means.

8. In an electric generator, an armature with groups of coils to generate currents at different voltages for as many independent power circuits, a surrounding field frame, current conducting means individually associated with the generating coil groups, means constituting the main brush holder support and carrying four brushes for the low voltage current conducting means, and an auxiliary brush holder support separate from said means and carrying two brushes for the high voltage conducting means.

9. In an electric generator, an armature with two groups of coils to generate current at different voltages for as many independent power circuits, a surrounding field frame, current conducting means individually associated with the generating coil groups, a unitary brush holder support carrying four brushes for the low voltage current conducting means, and a unitary brush holder support carrying two brushes for the high voltage current conducting means the negative brush holders of said unitary brush supports being electrically connected.

In testimony whereof, I have hereunto signed my name at Philadelphia, Pennsylvania, this 22nd day of October, 1927.

HERBERT J. GRAHAM.